United States Patent
Hornbuckle (10) Patent No.: US 10,504,170 B2
(45) Date of Patent: Dec. 10, 2019

(54) METHOD FOR PRODUCING GARMENTS FROM PATTERNS WITH SIZE GRID PROVIDING CUSTOM-LIKE FIT

(71) Applicant: Stantt, Inc., New York, NY (US)

(72) Inventor: Matt Hornbuckle, Hoboken, NJ (US)

(73) Assignee: Stantt, Inc., New York, NY (US)

( * ) Notice: Subject to any disclaimer, the term of this patent is extended or adjusted under 35 U.S.C. 154(b) by 92 days.

(21) Appl. No.: 15/990,862

(22) Filed: May 29, 2018

(65) Prior Publication Data
US 2019/0005559 A1     Jan. 3, 2019

Related U.S. Application Data

(63) Continuation of application No. 14/314,104, filed on Jun. 25, 2014, now abandoned.

(60) Provisional application No. 61/839,073, filed on Jun. 25, 2013.

(51) Int. Cl.
G06Q 30/00     (2012.01)
G06Q 30/06     (2012.01)

(52) U.S. Cl.
CPC ................. G06Q 30/0621 (2013.01)

(58) Field of Classification Search
CPC .................................... G06Q 30/0621
See application file for complete search history.

(56) References Cited

U.S. PATENT DOCUMENTS

| | | | |
|---|---|---|---|
| 1,342,010 A | 6/1920 | Weis | |
| 3,939,565 A | 2/1976 | Bush | |
| 4,184,260 A | 1/1980 | Brockman | |
| 4,222,170 A | 9/1980 | Koontz | |
| 4,598,376 A | 7/1986 | Burton et al. | |
| 4,995,514 A | 2/1991 | Forschner | |
| 5,548,519 A * | 8/1996 | Park ................. | A41H 3/007 700/135 |
| 5,566,867 A | 10/1996 | Goray | |
| 5,680,314 A | 10/1997 | Patterson et al. | |
| 5,768,135 A | 6/1998 | Park et al. | |
| 5,875,653 A | 3/1999 | Pedersen | |

(Continued)

FOREIGN PATENT DOCUMENTS

| | | |
|---|---|---|
| JP | 2003-500553 A | 1/2003 |
| KR | 10-2016-0085448 A | 7/2016 |

(Continued)

OTHER PUBLICATIONS

Loker, Suzanne, Susan Ashdown, and Katherine Schoenfelder. "Size-specific analysis of body scan data to improve apparel fit." Journal of Textile and Apparel, Technology and Management 4.3 (2005): 1-15. (Year: 2005).*

(Continued)

*Primary Examiner* — Matthew E Zimmerman (57) ABSTRACT

Garments are produced from patterns with a size grid that provides custom-like fit for ready-to-wear garments. The patterns are generated from a size chart of groups, sub groups and sub sub groups of anchor measures and priority measures. The size grid for various garments (men, women, children) includes a large number of sizes, anywhere from a few dozen to over two hundred. Given measures of a customer, these measures are screened against the groups, sub groups and sub sub groups to determine a correct size.

4 Claims, 5 Drawing Sheets

(56) References Cited

U.S. PATENT DOCUMENTS

| | | | |
|---|---|---|---|
| 5,956,525 | A | 9/1999 | Minsky |
| 6,546,309 | B1 | 4/2003 | Gazzuolo |
| 6,665,577 | B2 | 12/2003 | Onyshkevych et al. |
| 6,701,207 | B1 | 3/2004 | Gazzuolo |
| 6,748,290 | B2 | 6/2004 | Somaia |
| 6,760,708 | B1 | 7/2004 | Hubbard et al. |
| 6,968,075 | B1 | 11/2005 | Chang |
| 7,058,471 | B2 | 6/2006 | Watanabe |
| 7,092,782 | B2 | 8/2006 | Lee |
| 7,194,327 | B2 | 3/2007 | Lam |
| 7,260,445 | B2 | 8/2007 | Weiser et al. |
| 7,310,883 | B1 | 12/2007 | Park |
| 7,325,317 | B2 | 2/2008 | Matchett et al. |
| 7,522,970 | B2 | 4/2009 | Fernandez |
| 7,548,794 | B2 | 6/2009 | Vandergriff et al. |
| 7,577,577 | B2 | 8/2009 | Lyon et al. |
| 7,584,122 | B2 | 9/2009 | Kozinn |
| 7,657,341 | B2 | 2/2010 | Lind |
| 7,905,028 | B2 | 3/2011 | Sieber |
| 8,073,560 | B1 * | 12/2011 | Clardy ............... G06Q 10/10 700/132 |
| 8,307,560 | B2 | 11/2012 | Tulin |
| 8,756,165 | B1 | 6/2014 | Haake et al. |
| 9,107,462 | B1 | 8/2015 | Heinrich et al. |
| 9,623,578 | B1 | 4/2017 | Aminpour et al. |
| 2001/0037157 | A1 | 11/2001 | Lawton et al. |
| 2002/0138170 | A1 | 9/2002 | Onyshkevych et al. |
| 2002/0178061 | A1 | 11/2002 | Lam |
| 2004/0083142 | A1 | 4/2004 | Kozzinn |
| 2005/0119779 | A1 | 6/2005 | Amico et al. |
| 2007/0203608 | A1 | 8/2007 | Kang |
| 2008/0249652 | A1 | 10/2008 | Burr |
| 2009/0193675 | A1 | 8/2009 | Sieber |
| 2009/0287452 | A1 | 11/2009 | Stanley et al. |
| 2010/0293076 | A1 | 11/2010 | End et al. |
| 2011/0078209 | A1 * | 3/2011 | Rusberg ............... A41H 1/00 707/802 |
| 2011/0231278 | A1 | 9/2011 | Fries |
| 2016/0069003 | A1 | 3/2016 | Molnar |
| 2016/0244900 | A1 | 8/2016 | Schiestl et al. |

FOREIGN PATENT DOCUMENTS

| | | |
|---|---|---|
| WO | 00/70976 A1 | 11/2000 |
| WO | 2012/048193 A3 | 8/2012 |
| WO | 2012/110828 A1 | 8/2012 |

OTHER PUBLICATIONS

Non-Final Office Action received for U.S. Appl. No. 14/314,104, dated Nov. 30, 2016, 8 pages.

Final Office Action received for U.S. Appl. No. 14/314,104, dated Sep. 1, 2017, 17 pages.

* cited by examiner

FIG. 1

STEP 1: Obtain list of standard garment measures needed to create pattern

STEP 2: From a dataset that contains a statistically significant number of users with body measures related to the needed garment measure, run statistical analysis on body measures related to the needed garment measures to understand the correlations and ranges of the measures STEP 3: Based on qualitative input, identify the points on areas of a garment where fit is typically an issue STEP 4: Based on qualitative input from Step 3 and statistical analysis from step 2, categorize each needed garment measure from step 1 as Variant or Averaged measure STEP 5. Prioritize the Variant measures based on level of correlation to other measures and importance to fit. The highest priority measure becomes the Anchor against which all other variants are based.

STEP 6. Group body scan data in set increments for Anchor Variant measure. These increments become guidelines for the size matching algorithm of steps 15 and 16

STEP 7. Create sub groups within each group from step 6 based on increments of second priority variant measure STEP 8. Create sub buckets within each group from step 7 based on increments of third priority variant measure STEP 9. Use data to identify upper and lower limits on the measure range for each of the groups and sub groups of steps 6-8

STEP 10. Within each of the final sub-groups from step 9, run statistical analysis (averages, max/min and standard deviation) for each of the Averaged measures needed to create pattern and finalize size grid.

FIG. 2

STEP 11. The desired garment fit direction is determined which tells how many more/fewer inches the garment should be than the related body measure STEP 12. Within the final sub groups from step 8 in the data mining stage the single most common body iteration is identified.

STEP 13. A single pattern is created for this group with final set of body measures from Step 10 in data mining stage and fit/modified on a fit model(s) that fall within the variable measures of the group.

STEP 14. Patterns are generated for all of the final sub groups from measures finalized in step 10.

FIG. 3

STEP 15. The variable measures (and only those measures) used to create the sub-groups are collected from the consumer.

STEP 16. An algorithm goes level by level starting with the anchor measure group created in step 6 of data mining stage, followed by groups created in steps 7 and 8 of the data mining stage, to narrow down which size is best for the consumer.

METHOD FOR PRODUCING GARMENTS FROM PATTERNS WITH SIZE GRID PROVIDING CUSTOM-LIKE FIT

CLAIM OF PRIORITY

This application is a continuation of U.S. patent application Ser. No. 14/314,104, filed Jun. 24, 2014, pending, which is a nonprovisional application of, which claims the priority to, U.S. Provisional Application Ser. No. 61/839,073 filed on Jun. 25, 2013, and the contents of both are fully incorporated herein by reference.

FIELD OF THE INVENTION

The invention relates to designing and producing garments and matching consumers to the correct size through individual measurements and an algorithm. The invention also relates to a system to create a novel size grid.

BACKGROUND OF THE INVENTION

The current process in the garment industry focuses on minimizing costs, both on the development and in the market life stages of the product. One way to achieve this goal is to limit inventories and gain manufacturing efficiencies by limiting the number of sizes. The focus on minimizing cost is also applied to the size creation process. It is a common practice to select a single fit model that represents the "medium" fit of the brand. Often the specific measures of the model vary from brand to brand, with a consequence that a "medium" shirt is often different for each brand and this can result in consumer confusion and frustration when shopping. The specific article of clothing is fit to the medium fit model. Once the product fit is achieved, a single pattern is created and through a mostly automatic process called grading, the other sizes are created in a computer by simply clicking a few buttons. The garment is manufactured in each size, often without actually having any of the other sizes tried on. The current sizing process in the industry focuses on profits and attempts to fit as many people with the fewest sizes possible. The current industry standard is to have a limited number of sizes fitting to a large group of people well enough. Typically, a sizing grid may include for example six sizes: XS, S, M, L, XL and XXL. The result is a high level of dissatisfaction with the way ready-to-wear garments fit today and consumers often settling for something that doesn't fit exactly how he/she wants. The typical size range of XS through XXL only truly fits around 15% of consumers.

There have been some attempts to improve the current sizing system:

U.S. Pat. No. 7,092,782 discloses a system for providing garment fit for a target consumer group, comprising the steps of determining common body types for the target consumer group, establishing customized body measurement standards for each body type, selecting at least one real fit model for each body type, creating a sample garment in a range of sizes using grading rules, checking each sample garment with a fit model selected for each size and body type, and using the block to provide a garment for a target consumer group. Even if this disclosure improves the current industry standard, the method has flaws in that it's still based on the currently existing sizes and merely adds sub-sizes to these sizes by adding body-type measures. Therefore, for a consumer to successfully use this method to find a fitting garment they would first need to know his/her size of current size and additionally she/he needs to be able to guess his/her body type. Consequently the system improves the selection of fits as long as the consumer fits within the predetermined body types. However, if the consumer does not fit into any of the predetermined body types, or if she determines his/her body type incorrectly, the garment won't fit perfectly. The flaw in this system is that by relying on particular body types, it assumes that certain relationships of body measures remain unchanged within a body type. The focus in this system is still on creating versions of the already existing sizes. Thus the consumers are still forced to select between the typically limited sizes. Similarly as in any currently known sizing process, if the consumer is different than the specific shape or happens to fall in between one of the sizes the garment created from the system will not fit.

U.S. Pat. No. 7,310,883 discloses a method to provide an article of clothing after receiving alphanumeric characters determined from a sizing chart. The patent also discloses a method for making a sizing scheme chart for clothing. The sizing of this patent applies to measures in the charts, for example waist and hips, waist and bust or neck and chest measures. This system allows a consumer to select a size from among the current industry standard sizes based on two body measurements.

U.S. Pat. No. 6,701,207 provides a Fit Model Matrix, where each dimension of the matrix represent a different one of a plurality of body measurements, and each cell of the array represents a different body configuration. The matrix can be used to query for the fit data associated with at least one individual and at least one garment. The system provides a size for each part of human body and then allows a user to make a fit analysis of a garment of specified size on the user. The system does not provide any new sizing scheme, but rather it is a tool to analyze fit of garments.

The methods and practices available do not solve the problem that mass produced garments do not properly fit but to small parts of the population. The improvements in the sizing so far provided are all based on the currently existing sizing. Moreover, the improvements require the customer to estimate or guess his/her body type before she/he can select a garment that fits. Even further, there is no method for creating a size grid that would provide an increased number of sizes resulting in garments that closely fit to almost anyone. Moreover, there is no method that would include a sizing system and a method to select a fit size from the created sizes.

The invention disclosed here provides a solution to the above problems and others by providing a novel system for creating a large number of sizes, each one of which is specifically created to fit a different iteration of the body, and providing a system that easily allows a customer to select the fitting size with the help of an algorithm. The method provided here does not rely on the sizing system currently in use but is designed to entirely replace the current size creation process.

SUMMARY OF THE INVENTION

It is an object of this invention to provide a method to create a size grid for ready-to-wear garment with custom-like fit, said method comprising the steps of:
  a) obtaining a list of standard measures for a type of garment;
  b) identifying points of areas of the garment where fit is most often an issue;

c) running statistical analyses on body measures of a significant number of consumers related to the standard measure of step a)
d) categorizing each garment measure from step a) as averaged if not identified in step b) or as variant if positively identified in step b);
e) prioritizing the variant measures of step d) based on level of correlation to other measures and importance to fit, and determining the highest priority measure as anchor variant measure;
f) arranging body scan data into groups with set increments for anchor variant measure;
g) arranging body scan data of step 0 in into sub-groups with set increments for second highest priority of the variant measures of step e);
h) arranging body scan data of step g) in into further sub-groups with set increments for third highest priority of the variant measures of step e);
i) optionally creating additional sub-groups by repeating step h) with fourth, fifth and so on highest priority;
j) selecting a specific measure for each variant sub groups of step g, h or i;
k) within the final sub-groups of step g), h), or i) running statistical analysis for each of the averaged measure of step d), and the specific measures of step j); and
l) creating the size grid based on analysis of step k).

It is another object of the invention to provide a method to select a ready-to-wear garment, said method comprising: a customer providing individual measures for predetermined variant measures and applying the measures on an algorithm, said algorithm constructed by:
a) obtaining a list of standard measures for a type of garment;
b) identifying points of areas of the garment where fit is most often an issue;
c) running statistical analyses on body measures of a significant number of consumers related to the standard measure of step a)
d) categorizing each garment measure from step a) as averaged if not identified in step b) or as variant if positively identified in step b);
e) prioritizing the variant measures of step d) based on level of correlation to other measures and importance to fit, and determining the highest priority measure as anchor variant measure;
f) arranging body scan data into groups with set increments for anchor variant measure;
g) arranging body scan data of step 0 in into sub-groups with set increments for second highest priority of the variant measures of step e);
h) arranging body scan data of step g) in into further sub-groups with set increments for third highest priority of the variant measures of step e)
i) optionally creating additional sub-groups by repeating step h) with fourth, fifth and so on highest priority;
j) selecting a specific measure for each variant sub groups of step g, h or i;
k) within the final sub-groups of step h) or i) and the specific measures of step j) running statistical analysis for each of the averaged measure of step d); and
l) finalizing size grid based on analysis of step k);
wherein the algorithm starts with the anchor measure followed by the variant measures of step g), h) or i) to determine the best fit for the consumer and matches the consumer with an actual article of clothing that is produced from a pattern created according to the size grid of step 1.

It is a further object of the invention to provide ready-to-wear garments produced on the size grid of this disclosure.

Another object of this invention is to provide a method to sell and buy ready-to-wear garments based on the customer providing his/her variant measures and an algorithm identifying the best fit among the size grid of this disclosure.

DETAILED DESCRIPTION OF THE INVENTION

This disclosure provides a comprehensive method for selecting custom sized garments, where the method includes providing a large number of garment sizes based on measurements on real persons, and a method for a consumer to find a fit size based on a few key body measurements and an algorithm to determine the best fitting size from the size grid.

This disclosure provides a unique method for designing and producing apparel with a novel size grid and matching consumers to the correct size through provided measurements.

An advantage of this invention is that it creates an immense range of sizes whereby almost anyone can find a garment that fits well.

The method provided here does not rely on the sizing system currently in use but is designed to entirely replace the current size creation process.

An advantage of the method of this disclosure is that the customer does not need to define his/her body type; and does not need to know his/her size in the current size system, but the fitting garment will be suggested based on few simple measures provided by the customer or measured at the sales place, or provided from a body scan performed at the sales place.

The sizing system created in this disclosure fits nearly 97% of the total population of given sex without need for alteration.

Figure 1:
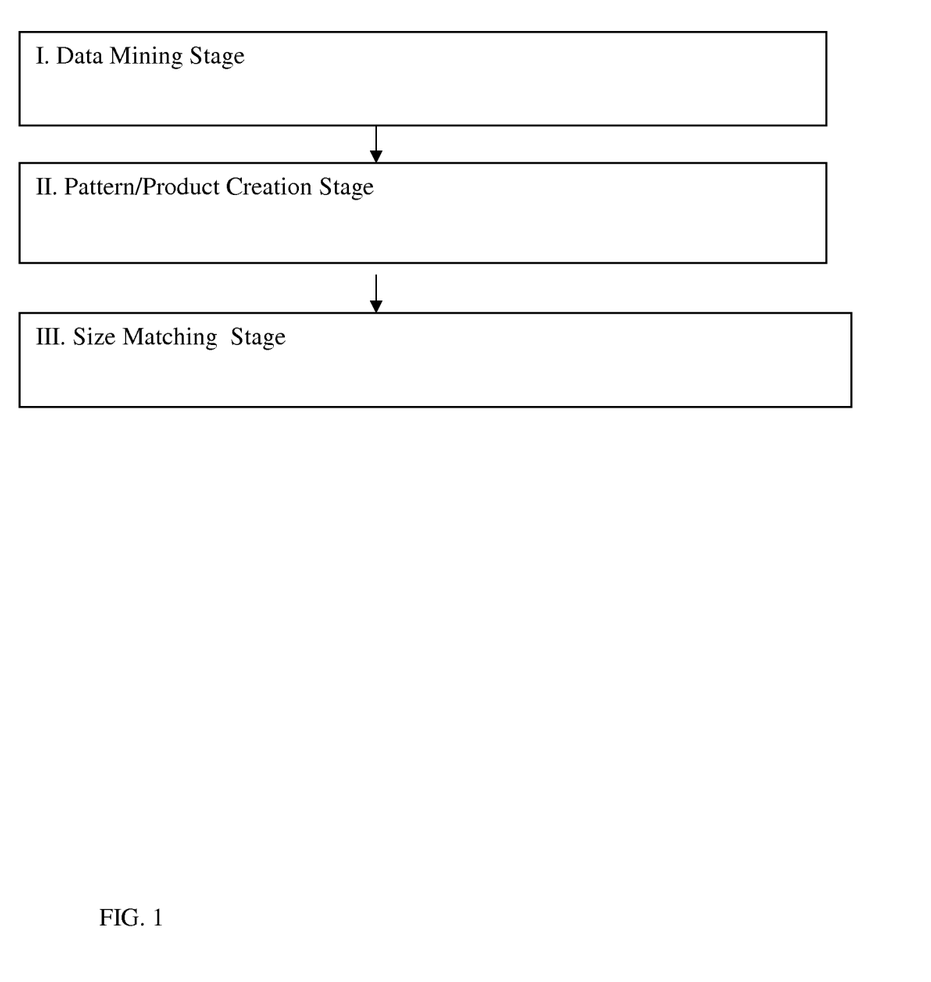
FIG. 1. shows schematically the three key steps of the method.

As is illustrated in FIG. 1, the method of this disclosure comprises three main steps: Data Mining Stage, Pattern and Product Creation Stage and Size Matching Stage. Data Mining Stage results in creation of novel size grid. Pattern/Product Creation Stage results in creating a selection of garments on the size grid. Size Matching Stage matches the customer with his/her size based on an algorithm. The algorithm is described in FIG. 5.

Data Mining Stage

Figure 2:
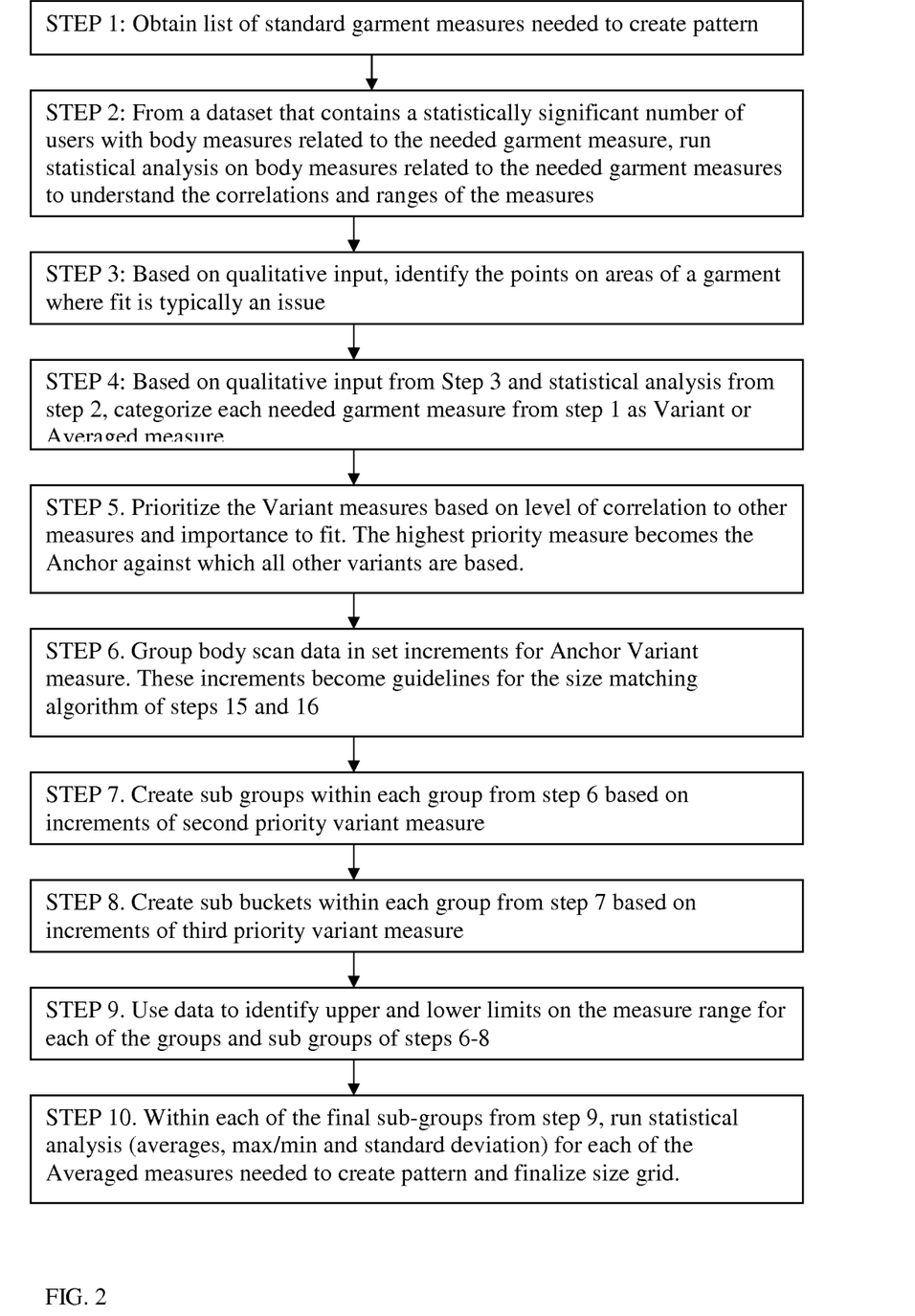
FIG. 2. Shows the steps 1-10 of the method belonging to the Data Mining Stage shown in FIG. 1.

FIG. 2 illustrates the steps in the Data Mining Stage. In the first step of Data Mining Stage a list of standard garment measures necessary for creating a pattern is obtained. Such measures for a polo shirt for example could include "Sleeve length", "Shoulder length", "Sleeve opening", "Chest circumference", "Waist opening", "Bottom opening", "Neck opening", and "Back Length". Each of these measures is needed before a pattern may be made.

In order to relate the measures of step 1 to real person's measures a data set of hundreds of body scans of real persons is used in step 2. A data set may be purchased for example from Size USA/TC2. In step 2, a statistical analysis is conducted using the body measures from the data set as related to the garment measures. This analysis will provide a dataset of real body measures associated with garment measures. Part of such data set could look for example as is shown below in Table 1.

TABLE 1

Part of a data set of body measures associated with garment measures. Measures are in inches.

| Chest | Waist | Hips | Neck base | Upper arm | Waist length | Across shoulders |
|---|---|---|---|---|---|---|
| 43.487 | 36.00 | 41.3 | 16.3 | 14.3 | 21.0 | 16.5 |
| 41.551 | 32.9 | 37.1 | 15.2 | 13.5 | 20.7 | 15.9 |
| 43.486 | 38.2 | 46.6 | 18.1 | 13.4 | 22.9 | 18.2 |
| 42.918 | 35.8 | 40.6 | 16.8 | 12.9 | 22.4 | 17.1 |

In the third step of the Data Mining Stage, data is collected to identify points on the areas on a garment where fit is typically an issue. Such data is typically collected through qualitative methods such as focus groups or interview, but can also be collected through surveys.

In the fourth step of the Data Mining Stage, based on the qualitative input of step 3 and statistical analysis of step 2, all the garment measures of the first step can be categorized as "Variant" or "Averaged". Variant Measures are measures where there is typically a fit problem and that typically show great variation in the dataset of step 2 and also typically have a high correlation to other key measures identifies in step 1.

In the fifth step of the Data Mining Stage, the Variant Measures of step 4 are prioritized based on degree of correlation to other measures and importance to fit. The Variant Measure that is determined to have the highest priority will be called the Anchor Measure. The measure with second highest priority would be the Second Priority, third highest priority measure would be the Third Priority and so on. As an example: it may be found that chest circumference measure on data set of step 2 correlates strongly and positively with shoulder length and neck circumference, while upper arm measure does not have much correlation with any other measures. If it is found in step 3 that chest circumference of a polo shirt is most often the point where there are fit problems it is likely that chest circumference would then be prioritized to be the Anchor Measure.

In step six, the body scan data of step 2 is grouped in increments in relation to the Anchor Measure. Part of such grouping could look for example as is shown in Table 2, where Chest circumference was prioritized as an Anchor measure:

TABLE 2

Part of a data set grouped based on increments for an Anchor Variant (here chest). Measures are in inches.

| Anchor Variant (Chest) Grouping | Chest | Waist | Hips | Neck Base | Upper arm | Waist lenght |
|---|---|---|---|---|---|---|
| 39"-40.9" | 39.064 | 33.4 | 38.6 | 17.1 | 11.3 | 217 |
|  | 40.154 | 34.0 | 37.5 | 17.3 | 13.0 | 21.6 |
|  | 40.156 | 32.6 | 41.8 | 16.8 | 11.9 | 20.8 |
| 41"-42.9" | 41.016 | 35.9 | 41.6 | 16.5 | 12.0 | 21 |
|  | 41.666 | 34.0 | 39.9 | 17.4 | 12.4 | 3 |
|  | 42.543 | 40.1 | 42.0 | 16.9 | 13.5 | 20.7 |

TABLE 2-continued

Part of a data set grouped based on increments for an Anchor Variant (here chest). Measures are in inches.

| Anchor Variant (Chest) Grouping | Chest | Waist | Hips | Neck Base | Upper arm | Waist lenght |
|---|---|---|---|---|---|---|
| 43-44.9" | 43.011 | 35.6 | 41.3 | 17.0 | 13.0 | 20.3 |
|  | 44.232 | 39.8 | 43.1 | 17.8 | 13.3 | 19 |
|  | 44.454 | 38.4 | 45.4 | 17.8 | 13.4 | 21.0 |

In the seventh step of the data mining stage, the data set of the sixth step is further grouped in increments based on Second Priority measures. Part of the resulting data set could look as shown in Table 3.

TABLE 3

Subgrouping of data set based on increments of Second Priority measures. Measures are in inches.

| Anchor Variant (Chest) Grouping | Chest | Second Priority (Waist) Sub-Group | Waist | Hips | Neck Base | Upper arm |
|---|---|---|---|---|---|---|
| 39"-40.9" | 39.064 | 32.1"-34" | 33.4 | 38.6 | 17.1 | 11.3 |
|  | 40.154 |  | 33.9 | 37.5 | 17.3 | 13 |
|  | 40.156 |  | 32.6 | 41.8 | 16.8 | 11.9 |
|  | 39.318 | 34.1"-36" | 34.7 | 39.5 | 15.2 | 12.3 |
|  | 40.678 |  | 35.3 | 42.5 | 17.2 | 12.6 |
|  | 39.018 |  | 35.9 | 40.1 | 16.8 | 11.5 |
|  | 40.812 | 36.1"-38" | 36.2 | 43.2 | 16.3 | 14.2 |
|  | 40.382 |  | 37.5 | 41.6 | 15.1 | 11.2 |
|  | 40.126 |  | 37.2 | 39.9 | 17.9 | 13.8 |
| 41"-42.9" | 41.016 | 34.1"-36" | 35.9 | 41.6 | 16.5 | 12 |
|  | 41.639 |  | 34.4 | 39.9 | 17.4 | 12.4 |
|  | 42.543 |  | 40.1 | 42 | 16.9 | 13.5 |
|  | 42.568 | 36.1"-38" | 36.1 | 43.2 | 17.3 | 11.4 |
|  | 41.264 |  | 37.9 | 41.8 | 17.9 | 12.6 |
|  | 42.893 |  | 37.4 | 42.8 | 18.0 | 13.8 |
|  | 41.013 | 38.1"-40" | 38.9 | 43.1 | 16.6 | 11.5 |
|  | 42.364 |  | 38.2 | 42.3 | 17.3 | 12.9 |
|  | 41.974 |  | 39.9 | 44.8 | 18.1 | 14.1 |
| 43-44.9" | 43.011 | 35.6"-39.8" | 35.6 | 41.3 | 17.1 | 13.1 |
|  | 44.232 |  | 39.8 | 43.1 | 17.8 | 13.3 |
|  | 44.454 |  | 38.4 | 45.4 | 17.5 | 13.4 |
|  | 43.912 | 36.1"-38" | 37.5 | 42.8 | 18.4 | 12.9 |
|  | 44.823 |  | 36.4 | 45.8 | 17.9 | 13.5 |
|  | 43.292 |  | 37.9 | 44.2 | 16.9 | 12.9 |
|  | 44.192 | 38.1"-39" | 38.2 | 46.1 | 17.8 | 13.4 |
|  | 44.728 |  | 38.5 | 45.4 | 18.6 | 12.8 |
|  | 43.917 |  | 38.9 | 46.5 | 18.1 | 13.1 |

In the eighth step of the data mining step further sub categories are created based on increments of Third Priority. Part of such data set could look like shown in Table 4.

TABLE 4

Sub grouping of data set based on increments of Third Priority measures. Measures are in inches.

| Anchor Variant (Chest) Grouping | Chest | Second Priority (Waist) Sub-Group | Waist | Third Priority (Hip) Sub-Group | Hips | Neck Base | Upper arm |
|---|---|---|---|---|---|---|---|
| 39"-40.9" | 39.064 | 32.1"-34" | 33.4 | 33.1"-35" | 33.6 | 17.1 | 11.3 |
|  | 39.582 |  | 33.8 |  | 34.8 | 15.3 | 12.3 |
|  | 40.154 |  | 33.9 | 35.1"-37" | 36.2 | 17.3 | 13.0 |

TABLE 4-continued

Sub grouping of data set based on increments of
Third Priority measures. Measures are in inches.

| Anchor Variant (Chest) Grouping | Chest | Second Priority (Waist) Sub-Group | Waist | Third Priority (Hip) Sub-Sub-Group | Hips | Neck Base | Upper arm |
|---|---|---|---|---|---|---|---|
| | 40.329 | | 33.1 | | 35.4 | 16.2 | 11.9 |
| | 40.156 | | 32.6 | 37.1"-39" | 37.9 | 16.8 | 11.8 |
| | 39.395 | | 32.2 | | 38.6 | 15.9 | 12.4 |
| | 39.318 | 34.1"-36" | 34.7 | 35.1"-37" | 36.3 | 15.2 | 12.3 |
| | 39.578 | | 34.2 | | 35.7 | 16.4 | 12.1 |
| | 40.678 | | 35.3 | 37.1"-39" | 38.6 | 17.2 | 12.6 |
| | 40.194 | | 35.2 | | 38.1 | 17.6 | 11.4 |
| | 39.018 | | 35.9 | 39.1"-41" | 40.1 | 16.8 | 11.5 |
| | 39.239 | | 35.0 | | 39.7 | 16.1 | 13.3 |
| | 40.812 | 36.1"-38" | 36.2 | 37.1"-39" | 38.3 | 16.3 | 14.2 |
| | 40.126 | | 37.4 | | 37.2 | 15.4 | 12.1 |
| | 40.129 | | 36.1 | 39.1"-41" | 39.8 | 17.3 | 13.2 |
| | 39.293 | | 37.2 | | 40.7 | 16.9 | 11.8 |
| | 40.382 | | 37.5 | 41.1"-43" | 41.6 | 15.1 | 11.2 |
| | 39.398 | | 36.9 | | 39.9 | 17.9 | 13.8 |
| 41"-42.9" | 41.016 | 34.1"-36" | 35.9 | 35.1"-37" | 36.0 | 16.5 | 12.0 |
| | 42.253 | | 35.7 | | 35.8 | 16.0 | 12.2 |
| | 41.639 | | 34.4 | 37.1"-39" | 38.5 | 17.4 | 12.4 |
| | 42.346 | | 35.9 | | 37.1 | 16.2 | 14.1 |
| | 42.543 | | 40.1 | 39.1"-41" | 39.8 | 16.9 | 13.5 |
| | 41.346 | | 34.2 | | 40.1 | 17.8 | 12.6 |
| | 42.568 | 36.1"-38" | 36.1 | 37.1"-39" | 37.2 | 17.3 | 11.4 |
| | 41.567 | | 37.2 | | 38.7 | 16.8 | 11.9 |
| | 41.264 | | 37.9 | 39.1"-41" | 40.8 | 17.9 | 12.6 |
| | 42.425 | | 36.4 | | 40.2 | 17.5 | 12.3 |
| | 42.893 | | 37.4 | 41.1"-43" | 42.8 | 18.0 | 13.8 |
| | 42.457 | | 37.3 | | 42.4 | 18.4 | 12.6 |
| | 41.013 | 38.1"-40" | 38.9 | 39.1"-41" | 40.2 | 16.6 | 11.5 |
| | 41.127 | | 38.5 | | 39.4 | 18.2 | 13.5 |
| | 42.364 | | 38.2 | 41.1"-43" | 42.3 | 17.3 | 12.9 |
| | 41.023 | | 39.4 | | 42.1 | 17.1 | 12.3 |
| | 41.974 | | 39.9 | 43.1"-45" | 44.8 | 18.1 | 14.1 |
| | 42.893 | | 39.2 | | 43.9 | 16.9 | 13.7 |

As many sub groups may be created as desired. According to one preferred embodiment one to five sub groups may be created. According to another preferred embodiment three to five sub groups may be created. Most preferably two sub groups may be created.

In step nine of the Data Mining Stage upper and lower limits of the measure ranges of the groups and subgroups are determined.

In the tenth step of the data mining stage a statistical analysis including averages, maximums, minimums and standard deviations, is conducted within each of the final sub groups of step 8 for each of the Averaged Measures determined in step 4. Final body size is created based on this data. Part of the resulting information so created may look as shown in Table 5.

TABLE 5

Part of information created by determining through statistical
analysis the Averaged measures within each sub groups and
sub sub groups. The final body size chart is created based on
this information.

| Anchor variant | Second priority | Third priority | Averaged measure 1 | Averaged measure 2 | Resulting size |
|---|---|---|---|---|---|
| #Group 1 | Sub group 1 | Sub-sub group 1 | | | #1 |
| | | Sub-sub group 2 | | | #2 |

TABLE 5-continued

Part of information created by determining through statistical
analysis the Averaged measures within each sub groups and
sub sub groups. The final body size chart is created based on
this information.

| Anchor variant | Second priority | Third priority | Averaged measure 1 | Averaged measure 2 | Resulting size |
|---|---|---|---|---|---|
| | | Sub-sub group 3 | | | #3 |
| | Sub group 2 | Sub sub group 1 | | | #4 |
| | | Sub sub group 2 | | | #5 |
| | | Sub sub group 3 | | | #6 |
| | Sub Group 3 | Sub sub group 1 | | | #7 |
| | | Sub sub group 2 | | | #8 |
| | | Sub sub group 3 | | | #9 |
| Group 2 | Sub group 1 | Sub sub group 1 | | | #10 |
| | | Sub sub group 2 | | | #11 |
| | | Sub sub group 3 | | | #12 |
| | Sub group 2 | Sub sub group 1 | | | #13 |
| | | Sub sub group 2 | | | #14 |
| | | Sub sub group 3 | | | #15 |

The resulting size chart will include a number of sizes that is considerably higher than in any size chart currently in use. Typically the size chart according to this inventions is anywhere between few dozen to over two hundred. The number of the sizes depends on how the increments of the Anchor Measure are selected and how many Priority Measures are used to create subgroups.

Pattern and Product Creation Stage

Figure 3:
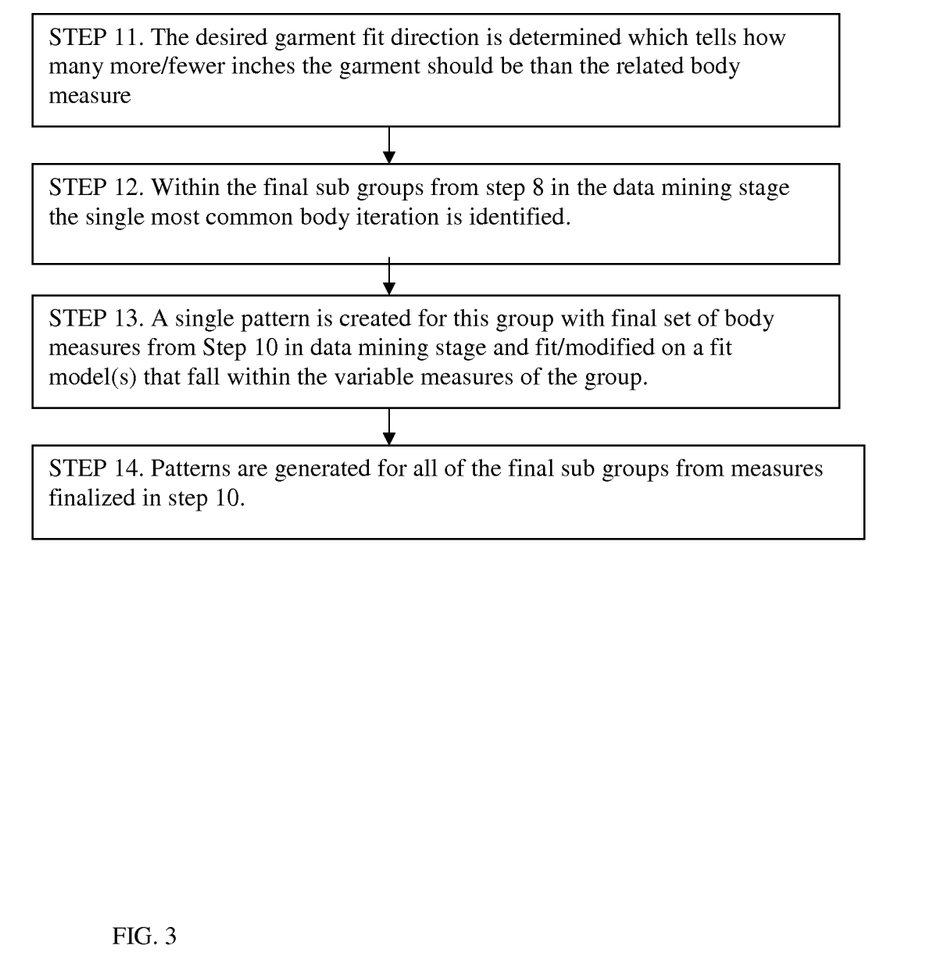
FIG. 3. Shows the steps 11-14 of the method belonging to the pattern/product creation stage shown in FIG. 1.

As is shown in FIG. 1, the second stage of this method is pattern/product creation stage. FIG. 3 shows the steps of this stage.

In step 11 the desired garment fit direction is determined. This step is the fit-ease step and will indicate how many more or how many fewer inches the garment should have than the related body measures. For example, it may identified that a garment with the right fit will have 8" more in the circumference of the waist on the garment than for that particular measure on the body. If the second Variant measure is waist a size specific to the person in the 34" sub-group is to be created, then 8" would be added to that body measure to give us the waist circumference of the garment a measure of 42". That fit ease is applied to every one of the waist sub groups.

In step 12 the single most common body iteration is identified from the resulting sizes.

In step 13 a single pattern is created for the most common body iteration of step 12 with final set of body measures from step 10 and the fit ease as identified in step 11 and the garment is produced. The garment is tested on a fit model(s) that falls within the variant measures of that group.

In step 14 patterns are generated for all of the final sub groups from measures from step 10 and garments are produced from the patterns. As many of the variant sub groups are tested on a fit model as possible to ensure a correct fit.

Size Matching Stage

Figure 4:
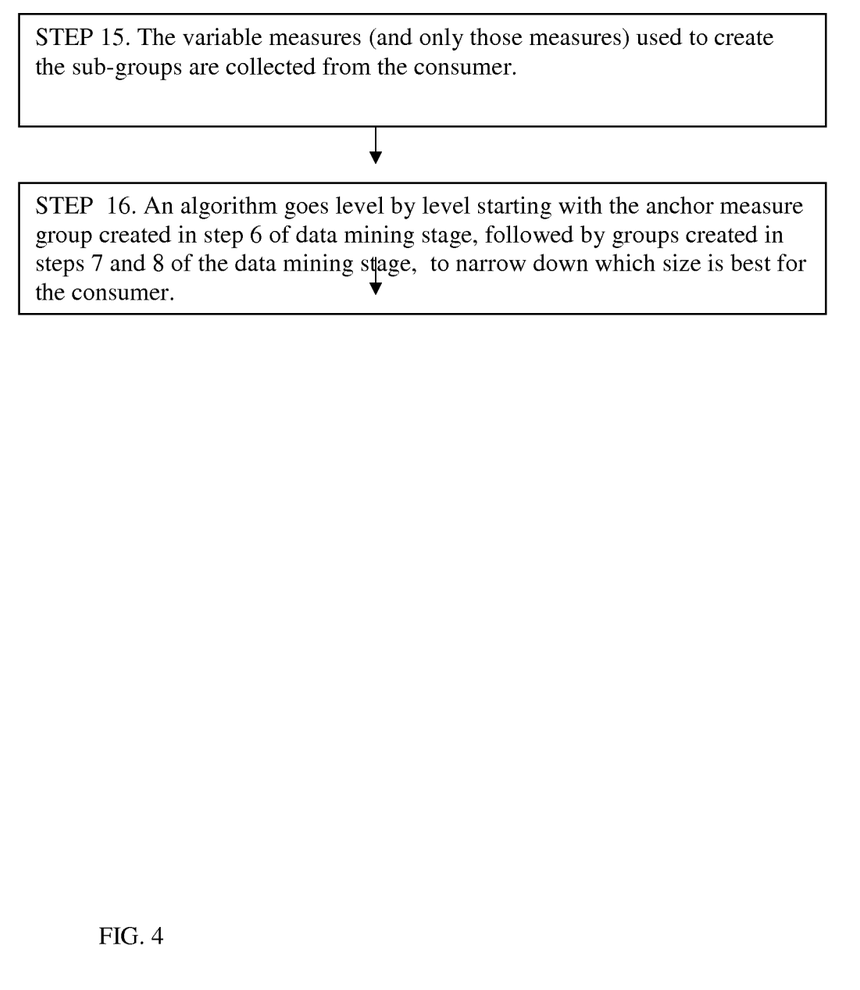
FIG. 4. Shows the steps 15 and 16 of the method belonging to the size matching stage shown in FIG. 1.

As is shown in FIG. 1 the last stage of the method is the size matching stage. FIG. 4 shows the steps of the size matching stage. This stage enables a consumer to be easily matched to the correct size with the help of an algorithm.

In step 15 the variant measures (and only those) used to create sub groups are collected from the consumer. The consumer may already know his/her measures or the measures may be taken by the consumer or by a tailor or collected from a body scan.

Figure 5:
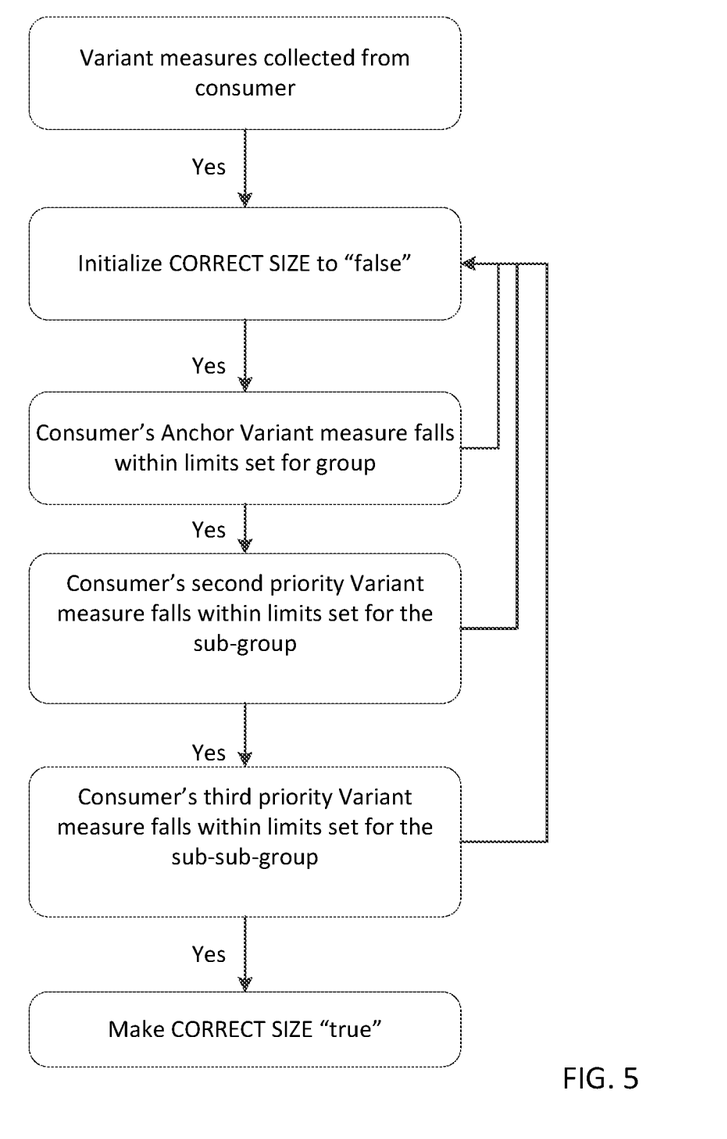
FIG. 5. illustrates the algorithm for a three variant measure garment. The algorithm is used to select the fitting size from the size grid.

In step 16 an algorithm is used to determine the best fitting for the customer based on his individual variant measures and the data behind the size grid. The algorithm would first identify into which Anchor Variant group the measures of the consumer falls. Then the algorithm identifies the sub group into which measures of the consumer falls. The algorithm then goes through each following sub sub group and suggests one or more of the sizes. FIG. 5 provides a flow chart showing the principle of the algorithm. The algorithm matches the consumer with the single size that fits him/her best based on the Variant measures.

One preferred embodiment of the invention is a method to provide a size grid for various garments (men, women, children) that includes a large number of sizes as is described above and shown in FIG. 2.

Another embodiment of the invention is a method to create garments having the sizes according to the size grid of this invention and as described above and shown in FIG. 3.

Yet another embodiment of the invention includes methods for a consumer to select a fit garment from garments according to the size grid as is described above and shown in FIG. 4.

One preferred embodiment of the invention includes enabling consumers to buy ready-to-wear garments with a custom-like fit online. The customer would enter his variant measures online and the algorithm would screen those measures against the groups, sub groups and sub sub groups and determine the correct size. Item and color selections are made either before or after the variant measures are input and then the garments are shipped to the customer. The data is saved and the customer may at any time later order the same size or change his variable measures on the website.

Another embodiment includes a method, where the customer enters a store and is scanned or measured by a tailor/store associate for his/her variant measures. The algorithm is then applied to match the body measures with the single size that fits the customer best among the large range of sizes for each article of clothing. The customer then makes item, color and quantity selection on either an in-store touch screen or through a store associate and the items will be shipped to him/her. The body measure data may be saved and the customer may in future buy all his/her garments for example online.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method for generating patterns for manufacturing ready-to-wear garments with a custom-like fit of a type of garment according to a size grid, said method comprising:
   accessing body scan data of a statistically significant number of consumers including body measures for a list of standard measures for the type of garment;
   for each standard measure in the list of standard measures, categorizing the standard measure as averaged or as variant based on whether the standard measure is for an area related to fit of the type of garment, and based on statistical analysis of the body scan data;
   prioritizing the variant standard measures based on, for each variant standard measure, a degree of correlation of the variant standard measure to the other standard measures, and based on whether the variant standard measure is for an area related to fit, and determining a first highest priority variant standard measure as an anchor variant measure;
   arranging the accessed body scan data into groups with set increments for the anchor variant measure;
   arranging the accessed body scan data in the groups into first sub-groups with set increments for a second highest priority variant standard measure from among the prioritized variant standard measures;
   arranging the accessed body scan data in the groups and first subgroups into second sub-groups with set increments for a third highest priority variant standard measure from among the prioritized variant standard measures;
   for each second subgroup, selecting a body measure for each variant standard measure;
   within each of the second sub-groups, running statistical analysis for each of the averaged standard measures;
   creating a size grid defining a plurality of sizes, wherein each size has a value for each of the standard measures based on the selected body measures for the second subgroups, and the statistical analyses of the average standard measures performed within the second sub-groups;
   for each size, generating a pattern for manufacturing a ready-to-wear garment of the type of garment, the pattern having dimensions based on the values for each of the standard measures according to the size grid; and
   manufacturing a garment of each size using the pattern determined for the size.

2. The method of claim 1, wherein the size grid has between 30 and 250 sizes.

3. The method of claim 1, further comprising:
   creating a single pattern for a single size corresponding to a selected second subgroup, and
   fitting and modifying the single pattern on a fit model having measures falling within the variant measures of the selected second sub group.

4. The method of claim 1, further comprising:
   arranging the accessed body scan data in the groups, first subgroups and second subgroups into third sub-groups with set increments for a fourth highest priority variant standard measure from among the prioritized variant standard measures; and
   wherein the statistical analysis for each of the averaged standard measures is performed within each of the third sub-groups.

* * * * *